United States Patent

[11] 3,586,949

| [72] | Inventors | Kenneth D. Spear<br>Southington;<br>Carles F. Raber, Simsbury, both of, Conn. |
|---|---|---|
| [21] | Appl. No. | 731,420 |
| [22] | Filed | May 23, 1968 |
| [45] | Patented | June 22, 1971 |
| [73] | Assignee | Pratt and Whitney Inc.<br>West Hartford, Conn. |

[54] THREE-PHASE DC MOTOR CONTROL SYSTEM
4 Claims, 4 Drawing Figs.

[52] U.S. Cl. ............................................. 318/257,
318/293, 318/326, 318/332
[51] Int. Cl. ........................................... H02p 5/00
[50] Field of Search .......................................... 318/257,
293, 326, 332, 308

[56] References Cited
UNITED STATES PATENTS

| 3,401,325 | 9/1968 | Stringer | 318/302 |
|---|---|---|---|
| 3,458,790 | 7/1969 | Wilkerson | 318/258 |
| 3,252,069 | 5/1966 | Ringrose | 318/308 |
| 3,470,437 | 9/1969 | Douglass | 318/308 |
| 3,413,534 | 11/1968 | Stringer | 318/326 |
| 3,428,880 | 2/1969 | Muller | 318/257 |
| 3,431,479 | 3/1969 | Voslyn | 318/293 |

Primary Examiner—Oris L. Rader
Assistant Examiner—K. L. Crosson
Attorney—Delio and Montgomery ABSTRACT: This invention is directed to a three-phase DC motor drive for use in conjunction with machine tools for driving a spindle or a slide. In particular, the invention comprises a silicon controlled rectifier (SCR) assembly, utilized to permit three-phase line voltages to be applied across the armature of a DC motor. A tachometer is utilized to generate a signal indicative of the motor speed which is combined with a command signal and a current limit signal. From the combination of these signals, a signal is generated to control the firing of the SCR assembly. This invention includes the use of saturable reactors to prevent one of the SCR's of the assembly from firing while another is conducting. Also as an important feature of this invention, there is provided tachometer ripple cancellation in order to obtain a low noise output signal from the tachometer.

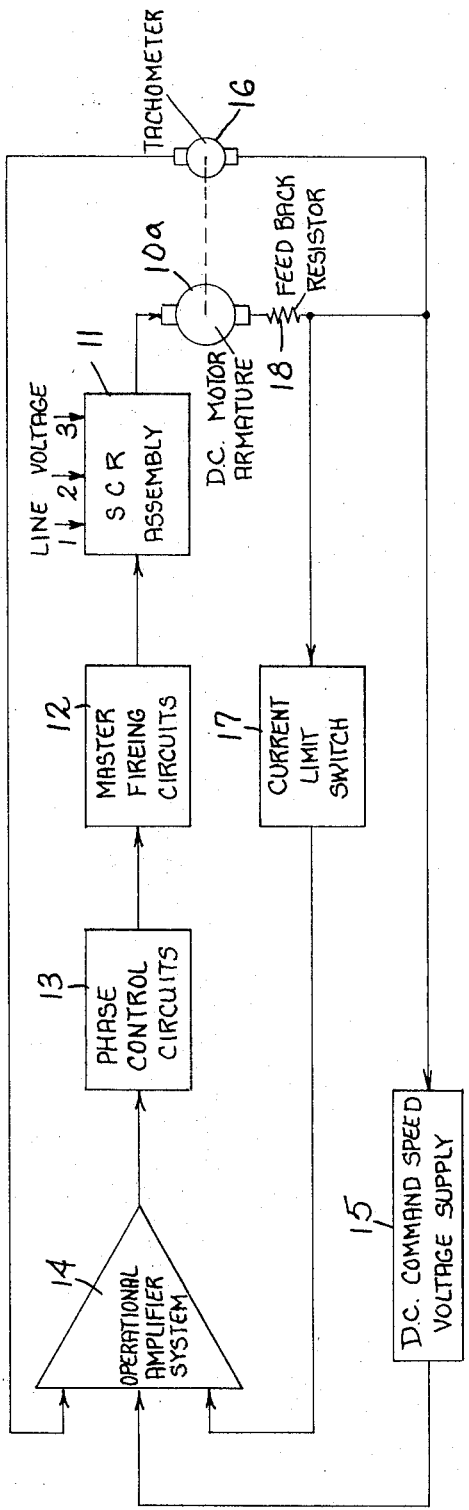

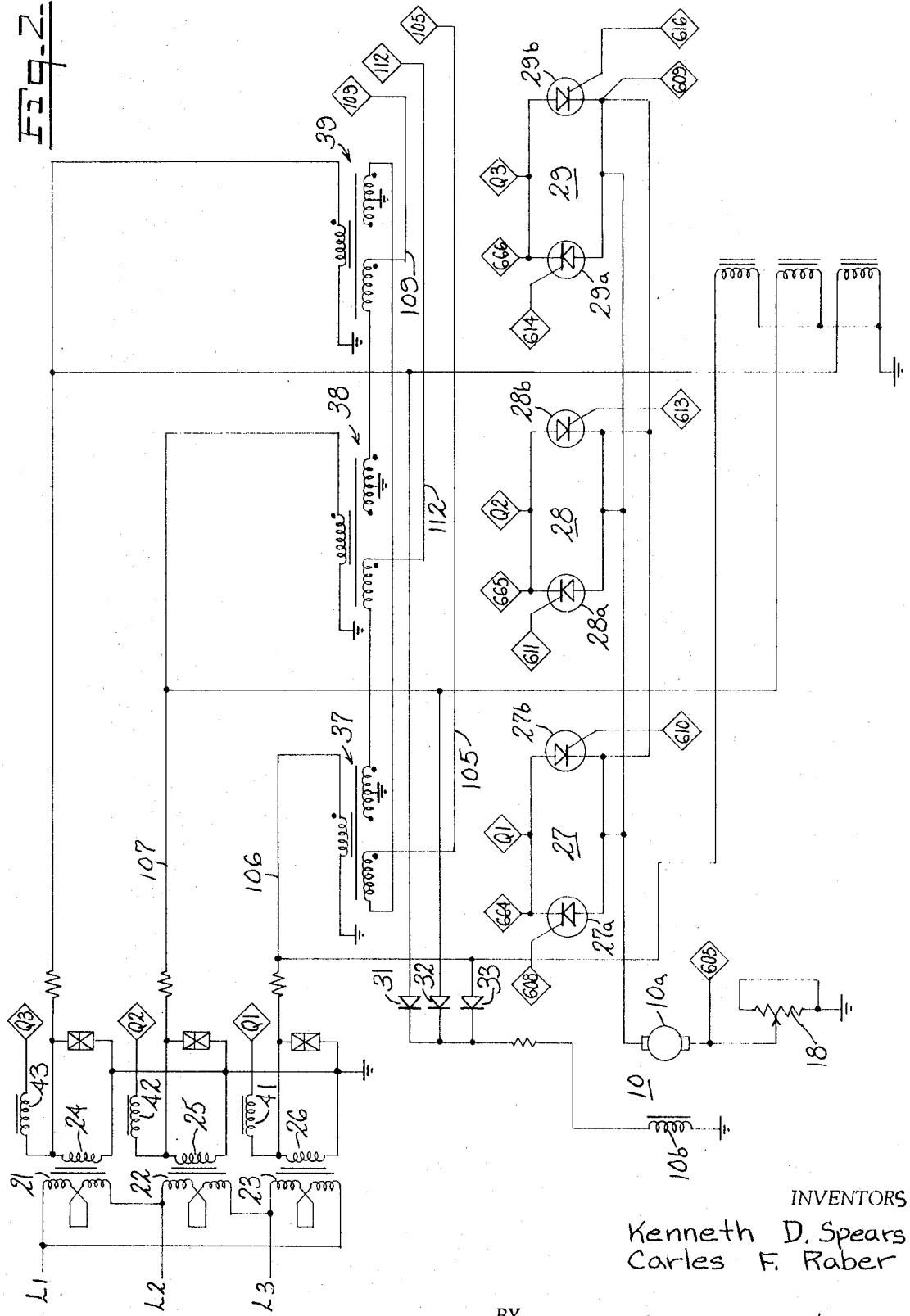

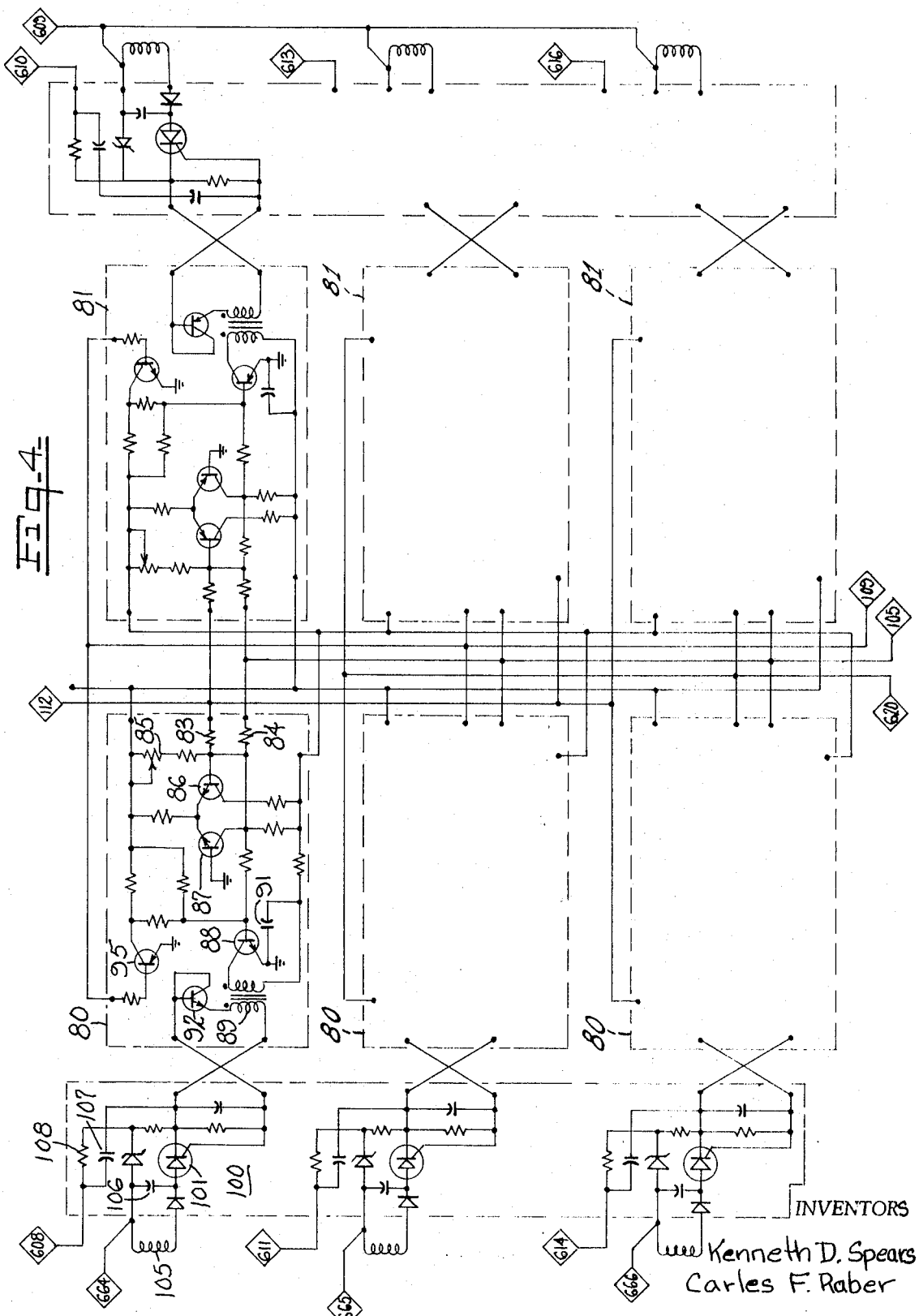

THREE-PHASE DC MOTOR CONTROL SYSTEM

This invention relates to a motor control system and, more particularly, to a three-phase direct current motor speed control system providing a wide range of regulated adjustable speed drives.

Direct current motors are widely utilized in machine tool applications and many other applications which require motors capable of having their operating speed varied over a wide range. For many years, variable speed DC motors have been energized from AC lines by the use of thyratron or ignatron tubes arranged to change the alternating voltage to a direct voltage suitable for operating the DC motor. Further modifications have included the use of a combination of phase-shifting networks and reference DC voltages to provide a signal to the grids of the thyratrons so as to vary the amount of voltage applied to the motor armature and thereby change its speed of operation.

As prior art control systems evolved, various compensation techniques developed to control and regulate the speed of motors. For example, a velocity feed back signal indicative of DC armature voltage was utilized to hold constant the voltage across the armature and thereby prevent change of motor speed. Additionally, IR compensation was included in many of the prior art motor control systems in order to compensate for the voltage drop caused by current flowing through the internal resistance of the armature. As the electronics industry progressed, tubes gave way to the newer devices such as the silicon controlled rectifier. A characteristic of the controllable rectifier, such as the silicon controlled rectifier, made it particularly suitable as a replacement for thyratrons in motor speed control systems. The silicon controlled rectifier is a solid-state device much like the transistor in that it has an anode, a cathode and a control element called a gate. The controlled rectifier conducts when the anode is sufficiently positive with respect to the cathode. Under normal operating conditions, the anode voltage is not set high enough to start conduction but it is set sufficiently high to maintain current flow once it starts. The gate of the rectifier performs much the same function as the grid of a thyratron. When a small voltage is applied to the gate, the rectifier fires, turns on (provided the correct anode to cathode voltage is also present). Thereafter, the gate has no control and cannot stop current flow.

The only way to extinguish the rectifier is by removing or reducing anode to cathode voltage below the holding point. When the current flow is stopped and the anode voltage is restored, the gate is once again in a position to exercise control. In replacing the thyratrons with solid-state controllable rectifiers, various newer and faster phase-shifting and compensating circuits to control the rectifiers were required. This is of particular importance when using three-phase power to drive a DC motor.

Accordingly, applicants have developed a new and improved solid-state motor speed control system which permits the use of power derived from three-phase line voltage to control the operation of a DC motor.

In view of the foregoing, it is an object of this invention to provide a new and improved motor speed control system.

Another object of this invention is to provide a new and improved circuitry for insuring proper operation of a three-phase motor control system. A further object of this invention is to provide a new and improved system which provides for cancellation of tachometer ripple.

Still other objects and advantages of the invention will in part be obvious and will in part be apparent from the specification.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawings, in which FIG. 1 is a block diagram of the three-phase motor control system according to the invention;

FIG. 2 is a schematic diagram illustrating the SCR assembly shown in block diagram form in FIG. 1;

FIG. 3 is a schematic diagram showing the current limit switch of FIG. 1 as well as the operational amplifier circuit of FIG. 1; and FIG. 4 is a diagram illustrating the phase control circuits and the master firing circuits of FIG. 1.

Referring to the block diagram of FIG. 1, there is shown the three-phase direct current reversible drive for a DC motor. It is to be understood that the control system according to this invention can also be used to drive a motor in only one direction by removing the circuitry concerned with reversing the direction of the motor. In this figure, a DC motor is shown at 10, to which the armature 10a is coupled in series with a silicon controlled rectifier assembly 11. The assembly 11 is used to convert the three-phase AC indicated as 1—3 line voltage, to a DC voltage to operate the motor armature 10a. The firing of the SCR assembly is controlled by master firing circuits, also preferably SCR's shown at 12, which are in turn controlled by phase control circuits shown at 13. The signal for controlling the phase control circuits is provided from operational amplifier system 14 which is responsive to a DC command or reference supply voltage provided from a source 15 and, additionally, from signals provided from a tachometer shown at 16. The tachometer is coupled to the motor shaft and is thus driven therewith.

In addition to the tachometer feedback signal, provided for controlling the speed of the DC motor, there is also provided a current limit switch which provides for steady state current limiting in the event the armature current is greater than a predetermined value. The current limit switch is shown at 17 and is responsive to a voltage provided from feedback resistor 18 connected in series with the motor armature.

Each of the blocks of FIG. 1 are shown more particularly schematically in the remaining figures. Accordingly, to more fully describe the invention, reference should now be had to FIG. 2 which discloses the SCR assembly 11 and the motor 10 as well as the circuitry for generating out-of-phase signals to control the phase control circuits 13 of FIG. 1. In addition, FIG. 2 discloses saturable reactors which are used to prevent a line-to-line short in the event one SCR is attempting to conduct, due to noise or other cause, while another SCR is turned on.

FIG. 2 shows three-phase line voltages indicated at L1, L2 and L3, which are applied to primary transformer windings shown at 21—23, respectively. The secondaries of these transformers are shown at 24—26, respectively. These line voltages applied through the transformers are then applied to the parallel combination of the controlled rectifiers or SCR's shown at 27—29, respectively. Each grouping of SCR's 27—29 includes two back-to-back SCR's 27a,27b, 28a, 28b and 29a, 29b, respectively. The groupings of SCR's are connected in series to the motor armature so as to derive a DC current to drive the motor 10. Direct current is provided to the field winding 10b of the motor 10 by the use of three rectifying diodes 31—33, respectively.

In FIG. 2 there is also shown transformers 37, 38 and 39 for generating quadrature voltages to operate the phase control circuits 13. In actuality, these transformers are a part of the phase control circuits and are utilized to provide a signal which is summed with the control signal from the operational amplifier 14. The signals are provided on lines 105, 109 and 112, as indicated in the drawing. The quadrature voltages lead the anode voltage of the SCR being controlled by approximately 90°.

FIG. 2 also shows three saturable reactors 41, 42 and 43 which are connected in series (pts. Q1 to Q1, etc.) with each of the SCR groupings 27—29. The purpose of the saturable reactors is to prevent, for example, SCR 28b turning on while SCR 27a is conducting, which would cause a line-to-line short between lines 106 and 107. The saturable reactor 42 in line 107 will prevent SCR 28b from turning on by providing flux in a direction to oppose the passage of current through SCR 28b for a period of time sufficient to permit SCR 27a to complete its conduction cycle. The flux direction in saturable reactor 42 opposes the current attempting to flow through SCR 28b until the saturated reactor drops out of its saturation state and reverses the core flux direction to offer a lower impedance to current flowing through SCR 28b.

Now referring to FIG. 3, there is disclosed the operational amplifier circuit as well as the current limiting switch. Signals provided from the tachometer 16 ((FIG. 1) are provided to the operational amplifier system shown at 14. The system 14 is provided with a filtering circuit 50 which is used to reduce the AC ripple on the DC voltage provided by the tachometer 16. The tachometer feedback signal is AC coupled into an operational amplifier shown at 51, through a capacitor 52. The amplifier 51 can be of the type sold by Fairchild Instruments Inc., (Nomenclature 702C). The amplifier 51 is a unity gain inverting amplifier and, accordingly, the tachometer signal provided through capacitor 52 is amplified with a unity gain, inverted and fed to a summing junction 58 through resistor 53 and capacitor 54. Thus, the AC ripple on the tachometer feedback signal, as well as the inverted AC ripple, are combined at point 58 and thereby, essentially, a DC tachometer feedback signal is provided having very little ripple content thereon. The inverted AC portion of the ripple cancels out the noninverted portion of the ripple voltage directly coupled to point 58 through the resistor 59.

To provide acceleration and deceleration control, a second operational amplifier is provided at 60 which is connected in a positive feedback configuration. The second amplifier 60 operates essentially as a differential amplifier and, also preferably, is of the type made by Fairchild Instruments Inc., (Nomenclature 709C). The DC reference voltage is provided to point 58 through a resistor shown at 62. Thereafter, this voltage is combined with the tachometer feedback voltage as well as a voltage provided from the current limit switch 17. The amplifier 60 is used to control the gain of the system in response to changes in load by the choice of the appropriate resistor-capacitor network coupled to the amplifier 60. Clamping diodes 66 and 67 are coupled to the input of amplifier 60, as shown. In addition, relay contact CR1 is provided at 68 and is used to prevent possible malfunction of the system when power is initially applied to the control or when the control is deenergized. When CR1 is open, the operational amplifier output is disconnected from the firing circuits, thereby preventing misfiring of an SCR due to changing amplifier bus voltages. The coil for operating CR1 is shown at 69 and power is supplied to the coil from a DC master control source, not shown.

As mentioned previously, current limit circuit 17 is also provided, coupled to point 58. The circuit 17 is coupled to a resistor 18 in series with the motor armature. The current limit circuit 17 provides a voltage of a polarity opposite to the polarity of the reference voltage, such that as the load increases and a substantial increase in current flow is detected, the motor speed is reduced. In essence, the diodes 70 and 71 will conduct when the respective voltages across them are such that the anode of the diode becomes positive with respect to the cathode. A voltage is compared at points 72 and 73 with a reference voltage provided from resistors 74 and 75, respectively. If either diode 70 or 71 becomes forward-biased, an output signal is supplied to retard the firing angle of the SCR's and, therefore, reduce the current flowing through the motor armature 10a.

Reference is now had to FIG. 4 for a description of the phase control circuits shown at 13, in FIG. 1. The phase control circuits essentially consist of six identical circuits and their associated phasing transformers, the phasing circuits having been described previously with reference to FIG. 2. These circuits are used to control motor direction as determined by the polarity of the output of the operational amplifier 60. The circuits 80 on the left are all identical and all use NPN transistors, whereas the circuits 81 for driving the motor in the reverse direction utilize PNP transistors. Since the operation of both circuits are identical, the operation of one NPN circuit only will be described. In the drawing, empty boxes are shown for the other circuits which are identical to the two circuits shown substantially in the upper part of the diagram. The same connections are made to these circuits as shown with reference to the top two circuits in the diagram.

Reference should now be had to circuit 80, wherein phasing signals and the command signal from operation amplifier circuit are summed through resistors shown at 83 and 84, respectively. When a positive control signal sufficient in magnitude to overcome a positive bias set by the variable resistor 85 appears at the base of transistor 86, transistor 86 will conduct. Transistor 87, normally on, switches off and a positive voltage appears at its collector which causes transistor 88 to conduct. When transistor 88 conducts, a low impedance path exists from the emitter of transistor 88 through its collector and through the primary of transformer 89. Accordingly, a capacitor 91 charged to DC voltage, discharges through this path and generates a pulse on the primary of transformer 89. As a result of transformer action, a pulse then appears across the secondary of transformer 89. A transistor 92 acts essentially as a diode to clip the negative pulse appearing on the secondary of the transformer when transistor 88 turns off. It is necessary to assure that during the negative half cycle of SCR anode voltage, transistor 88 is always reset. This is accomplished by the provision of transistor 95 cut off during the negative portion of SCR anode voltage by a 30° phase lag signal, thereby turning off transistor 88 and allowing capacitor 92 to charge in preparation for the next firing pulse.

The master firing circuits 12 comprise six identical circuits, one for each of the six phase control circuits (80, 81, etc.) which are transformer coupled thereto. Each circuit comprises SCR's, which are utilized to trigger the main SCR's of the assemblies 27—29, respectively. Since these circuits are identical, a description of only one of the circuits shown at 100 will be given.

The SCR shown at 101 conducts upon receiving a firing pulse from the master firing circuit 80. Each circuit comprises transformer secondaries, part of transformer 105, the primary of the transformer appearing in FIG. 2. The voltage generated from this winding is used to charge a capacitor shown at 106 to a peak AC voltage which is discharged through the SCR when it conducts. In order to get a large initial firing signal to insure that the primary SCR's in the motor control circuit latch, a capacitor 107 is provided which initially bypasses a resistor 108 to permit a high peak voltage to appear across the gates of the SCR driving the motor.

This completes a description of the invention. It is believed obvious that the invention provided herein may be used for various drives on any type of machine tools where three-phase power is available.

It will thus be seen that the objects set forth above among those made apparent from the preceding description are efficiently attained and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What I claim is:

1. A control system for a direct current motor having an armature winding which receives electrical energy from a three-phase alternating voltage source, three semiconductor controlled rectifier switching devices each having input, output and control electrodes, each of said devices having its output electrodes coupled in series with the motor armature and each of said devices having its input electrodes arranged to be coupled in series with a different one of the three-phase voltages, control means coupled to said control electrodes to control the conduction of said switching devices for controlling the speed of said motor, means providing a first signal for a motor speed reference, means for deriving a second signal indicative of the speed of the motor, means for combining said first and second signals to provide a speed error signal, means for applying said speed error signal to said control means, means responsive to the load current of said motor exceeding a predetermined value for providing a third signal proportional thereto, means for combining said third signal with said first signal to modify the reference speed of said motor and decrease the speed of said motor as the load current increases above said predetermined value, three additional semiconductor controlled rectifier devices, each of said additional devices being responsive to said control means to provide firing pulses to the control electrodes of one of said switching devices, and capacitor means coupled in circuit with said additional devices to provide fast rising gating pulses to the input electrodes of said switching devices.

2. A control system for a direct current motor having an armature winding which receives electrical energy from a three-phase source, three pairs of controlled rectifier switching devices, each device of said pairs having gage, anode and cathode electrodes and each device of said pairs having its anode and cathode electrodes connected in parallel with the other device of the pair, each of said pairs of devices arranged to be coupled in series with a different one of the three-phase voltages, one device of each pair being connected for conduction in one direction and the other device of each pair being connected for conduction in the other direction, and control means coupled to said control electrodes for controlling the time of conduction of said devices and the speed of the motor, a saturable reactor connected in series with each pair of devices, means providing a first signal for a motor speed reference, means for deriving a second signal indicative of the speed of the motor and means for deriving a third signal indicative of the electrical load on the motor, said control means including means for combining said first, second and third signals to control the speed of said motor and decrease the speed thereof if the electrical load on said motor exceeds a predetermined value.

3. A motor control system in which the speed of the motor is regulated to a predetermined speed comprising a direct current motor, means providing a speed reference signal, a tachometer coupled to said motor and adapted to provide a DC signal indicative of the speed of said motor, means for combining said reference signal and said speed indicative signal to provide a speed error signal, control means responsive to said speed error signal for supplying driving energy to said motor, means for deriving an inversion of said speed indicative signal and adding said inverted signal to said speed indicative signal to cancel the AC ripple which may be present on the speed indicative signal.

4. The system of claim 12 wherein said means for deriving an inversion of said speed indicative signal comprises capacitor means for coupling the AC components of the tachometer signal to an inverting circuit and thereafter the inverted AC component is summed with the tachometer signal to provide said speed error signal.

UNITED STATES PATENT OFFICE
CERTIFICATE OF CORRECTION

Patent No. 3,586,949      Dated June 22, 1971

Inventor(s) Kenneth D. Spear and Carles F. Raber

It is certified that error appears in the above-identified patent and that said Letters Patent are hereby corrected as shown below:

Column 3, line 26, change "noninverted" to --non-inverted--.

Column 4, line 30, "92" should read --91--.

Claim 2, line 4, change "gage" to --gate--.

Claim 4, line 1, change "12" to --3--.

Signed and sealed this 22nd day of February 1972.

(SEAL)
Attest:

EDWARD M. FLETCHER, JR.      ROBERT GOTTSCHALK
Attesting Officer      Commissioner of Patents